United States Patent
Kishibata et al.

(10) Patent No.: US 6,820,576 B2
(45) Date of Patent: Nov. 23, 2004

(54) VEHICLE DRIVEN BY INTERNAL COMBUSTION ENGINE HAVING GENERATOR

(75) Inventors: Kazuyoshi Kishibata, Numazu (JP); Masanori Nakagawa, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/458,169

(22) Filed: Jun. 10, 2003

(65) Prior Publication Data

US 2004/0010360 A1 Jan. 15, 2004

(30) Foreign Application Priority Data

Jul. 12, 2002 (JP) ......................................... 2002-204550
Apr. 15, 2003 (JP) ......................................... 2003-110578

(51) Int. Cl.$^7$ ................................................ F02B 43/08
(52) U.S. Cl. ............................................ 123/3; 701/54
(58) Field of Search ................................ 123/3; 701/54

(56) References Cited

U.S. PATENT DOCUMENTS

| | | | |
|---|---|---|---|
| 4,409,940 A | * 10/1983 | Gaus ........................ | 123/361 |
| 4,649,878 A | * 3/1987 | Otobe et al. ............ | 123/339.18 |
| 5,105,624 A | * 4/1992 | Kawamura ................... | 60/608 |
| 6,474,273 B1 | * 11/2002 | Kinoshita et al. ......... | 123/41 E |
| 6,692,405 B2 | * 2/2004 | Minowa et al. ................. | 477/5 |

FOREIGN PATENT DOCUMENTS

JP    2001-231106    8/2001

* cited by examiner

*Primary Examiner*—Thomas Denion
*Assistant Examiner*—Zelalem Eshete
(74) *Attorney, Agent, or Firm*—Pearne & Gordon LLP

(57) ABSTRACT

A vehicle driven by an internal combustion engine, which has a generator comprised so that: a crankshaft of the internal combustion engine is connected to drive wheels of the vehicle via a power transmission device having a centrifugal clutch; a rotor of a generator is connected to the crankshaft of the internal combustion engine via an acceleration mechanism; and in the case where the generator is operated to supply power to a load when the vehicle is stopped, the generator generates a nominal output while the internal combustion engine rotates at a certain rotational speed between an idle rotational speed and a clutch-in speed.

2 Claims, 6 Drawing Sheets

VEHICLE DRIVEN BY INTERNAL COMBUSTION ENGINE HAVING GENERATOR

TECHNICAL FIELD OF THE INVENTION

The present invention relates to a vehicle comprising an internal combustion engine for driving the vehicle and a generator driven by the internal combustion engine, and supplies power to a load when the vehicle is stopped.

BACKGROUND OF THE INVENTION

In recent years, vehicles driven by an internal combustion engine such as ATVs (All Terrain Vehicles), tractors, or recreation vehicles have been incorporating a generator driven by an internal combustion engine for driving a vehicle, and supplying a commercial AC output of AC 100 V or AC 200 V (50 Hz or 60 Hz) to a load when the vehicle is stopped, in order to allow electric tools or home appliances to be used outdoors. Such a vehicle is disclosed in, for example, Japanese Patent Application Laid-Open Publication No. 2001-231106.

Such a vehicle often uses a continuously variable transmission (CVT) having a gear position for cutting power transmission and a centrifugal clutch connected at a speed equal to or higher than a predetermined clutch-in speed (normally, 2000 r/min to 3000 r/min), as a power transmission device that is provided between an internal combustion engine and drive wheels.

When the vehicle driven by the internal combustion engine having the generator as described above uses the power transmission device including the centrifugal clutch, the generator is started in a state that the gear position of the power transmission device is in a position other than a neutral position or a parking position, and when a rotational speed of the internal combustion engine is increased to a rotational speed required for obtaining a predetermined generation output, the centrifugal clutch is connected to cause runaway of the vehicle. In order to prevent this, as disclosed in Japanese Patent Laid-Open Publication No. 2001-231106, the internal combustion engine driven vehicle has a gear position sensor that detects a gear position of the power transmission device, and only when the sensor detects that the gear position is in a position for cutting the power transmission, a rotational speed control in a generating mode is performed.

However, even with such a construction, if a failure of the gear position sensor, or a failure of the transmission device causes the gear position sensor to detect by mistake that the power transmission is cut, in spite that the power transmission device is in a state for power transmission, the generator is started, and thus a possibility of runaway of the vehicle at the time of generation cannot be completely eliminated.

SUMMARY OF THE INVENTION

Therefore, an object of the invention is to provide a vehicle driven by an internal combustion engine incorporating a generator that can prevent runaway of the vehicle at the time of generation independently of a gear position sensor.

The invention is applied to a vehicle driven by an internal combustion engine comprising a power transmission device that has a centrifugal clutch to be connected at a speed equal to or higher than a predetermined clutch-in speed, and is provided between a crankshaft of the internal combustion engine and drive wheels of the vehicle; and a generator driven by the internal combustion engine, wherein the generator is operated to supply power to a load when the vehicle is stopped. In the invention, the generator is constituted so as to generate a nominal output while the internal combustion engine rotates at a rotational speed between an idle rotational speed and the clutch-in speed.

By such a construction, the generator generates the nominal output while the engine rotates at the rotational speed between the idle rotational speed and the clutch-in speed, thus the rotational speed of the internal combustion engine does not reach the clutch-in speed when the generator is operated. Thus, a possibility of the centrifugal clutch being connected to cause runaway of the vehicle when the generator is operated can be eliminated.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF THE PREFERRED EMBODIMENTS

Preferred embodiments of the present invention will be hereinafter described with reference to the accompanying drawings.

An internal combustion engine driven vehicle according to the invention may be an ATV, a tractor, a recreational vehicle, or the like, that incorporates a power supply unit that uses a generator mounted to an internal combustion engine for driving the vehicle to generate an AC power at commercial frequencies, and use, a structure, and a type of the vehicle are arbitrary.

Figure 1:
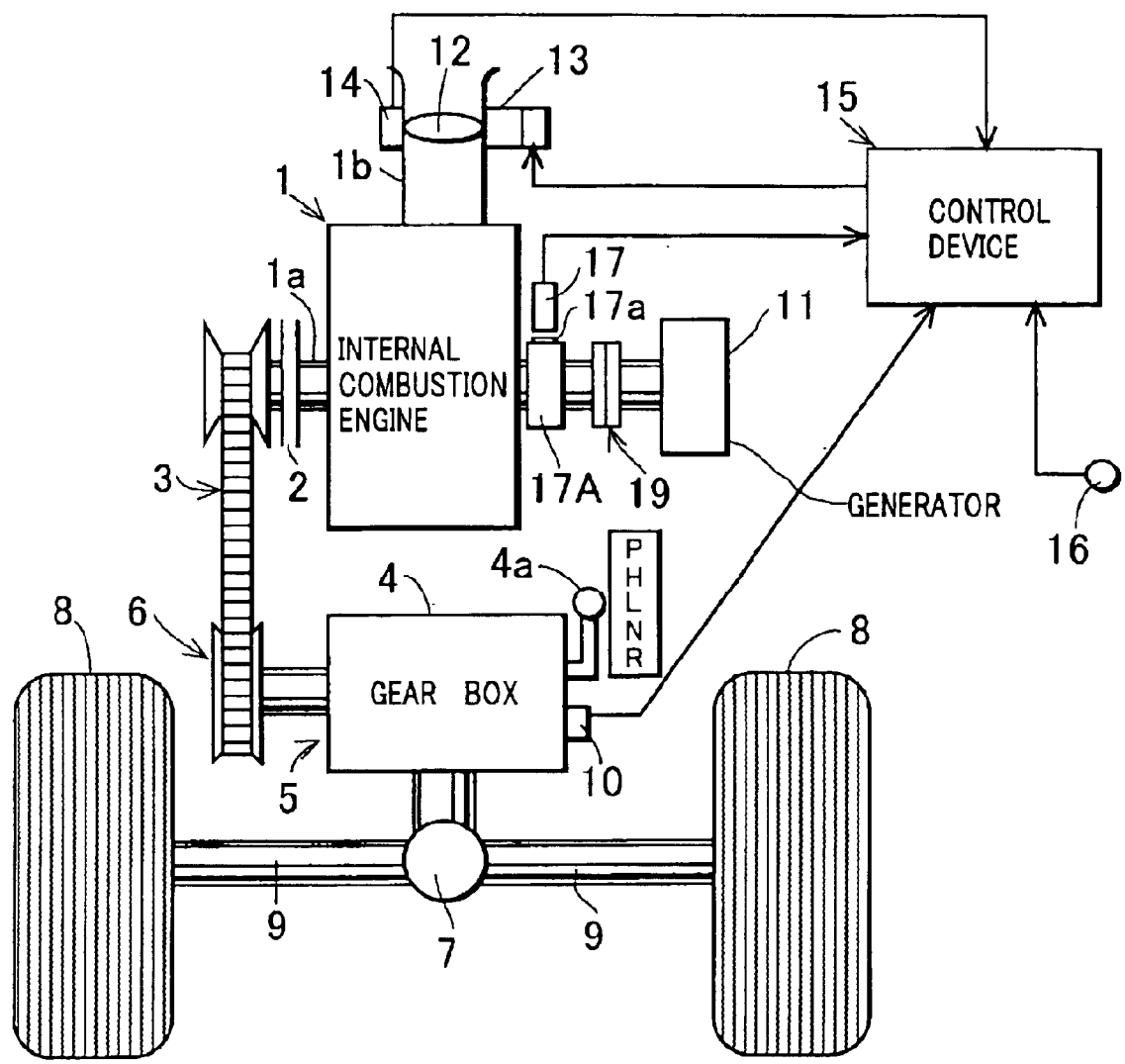
FIG. 1 is a schematic diagram of a construction of an embodiment of the invention.

FIG. 1 shows an example of a general construction of the internal combustion engine driven vehicle according to the invention. In FIG. 1, a reference numeral 1 denotes an internal combustion engine, and an end of a crankshaft 1a of the internal combustion engine 1 is connected to an axle 9 to which driving wheels 8 are mounted, via a power transmission device 6 including a centrifugal clutch 2 and a CVT (continuously variable transmission) 5 having a belt transmission mechanism 3 and a gear box 4, and via a differential gear 7. A gear position selection lever 4a is mounted to the gear box 4, and the lever is operated to switch a gear position to a parking position P, a high position H, a low position L, a neutral position N, or a reverse (backing up) position R. A gear position sensor 10 that detects the gear position is mounted to the gear box 4. Among those gear positions, the neutral position N and the parking position P are positions for cutting power transmission from the internal combustion engine to the drive wheels, and the high position H, the low position L, and the reverse (backing up) position R are positions for transmitting power from the internal combustion engine to the drive wheels.

A rotor of a generator 11 is mounted to the other end of the crankshaft 1a of the internal combustion engine 1 via a generator clutch 19 that can be controlled on/off. A stator of the generator 11 is secured to a mounting portion provided on a case or a cover of the engine.

The shown generator 11 is a synchronous generator in which field control can be performed, and a power supply unit is comprised of the generator 11 so as to generate an AC voltage at commercial frequencies when the vehicle is stopped.

A throttle valve 12 is mounted to an intake pipe 1b of the internal combustion engine, and an output shaft of an electric actuator 13 is connected to an operation shaft of the throttle valve. An input shaft of a throttle sensor 14 that generates an electric signal proportional to an opening degree of the throttle valve is also connected to the operation shaft of the throttle valve 12.

An unshown injector (an electromagnetic fuel injection valve) is mounted to the intake pipe 1b of the internal combustion engine 1, and an ignition plug is mounted to a cylinder head of the internal combustion engine.

A reference numeral 15 denotes a control device having a microprocessor, and mode selection means 16 constituted by a manually operated switch provides a selection instruction to the control device to select a control mode between a vehicle driving mode and a generating mode.

A signal generator 17 that generates a pulse signal at a particular crank angle position of the engine is mounted to the internal combustion engine 1, and an output of the signal generator is input to the control device 15 together with an output of the gear position sensor 10 and an output of the throttle sensor 14.

The shown signal generator 17 is comprised so as to generate a pulse signal when a leading edge and a trailing edge in a rotational direction of a reluctor (inductor) 17a constituted by a protrusion on an outer periphery of a rotor 17A are detected. The rotor 17A is directly connected to the crankshaft 1a of the generator 11.

Various sensors (not shown) that detect control conditions (engine temperature, atmospheric pressure, or the like) used for controlling an ignition timing and a fuel injection amount of the internal combustion engine are provided, and outputs of the sensors are input to the control device 15.

The control device 15 is comprised of an electric control unit (ECU) having a microprocessor. The unit causes the microprocessor to execute a predetermined program and constitutes a internal combustion engine control unit which performs control required for operating the internal combustion engine; a throttle control unit that controls a throttle valve opening degree so as to rotate the internal combustion engine at a desired rotational speed in accordance with the control mode selected by the mode selection means; and a field control unit that controls a field current of the generator so as to keep an output of the generator at a nominal output.

In the embodiment in FIG. 1, the generator clutch 19 is an electromagnetic clutch that can be switched on/off, and the generator clutch 19 is switched on/off to allow the rotor of the generator 11 to be connected to the crankshaft of the engine, or detached from the crankshaft.

Figure 4:
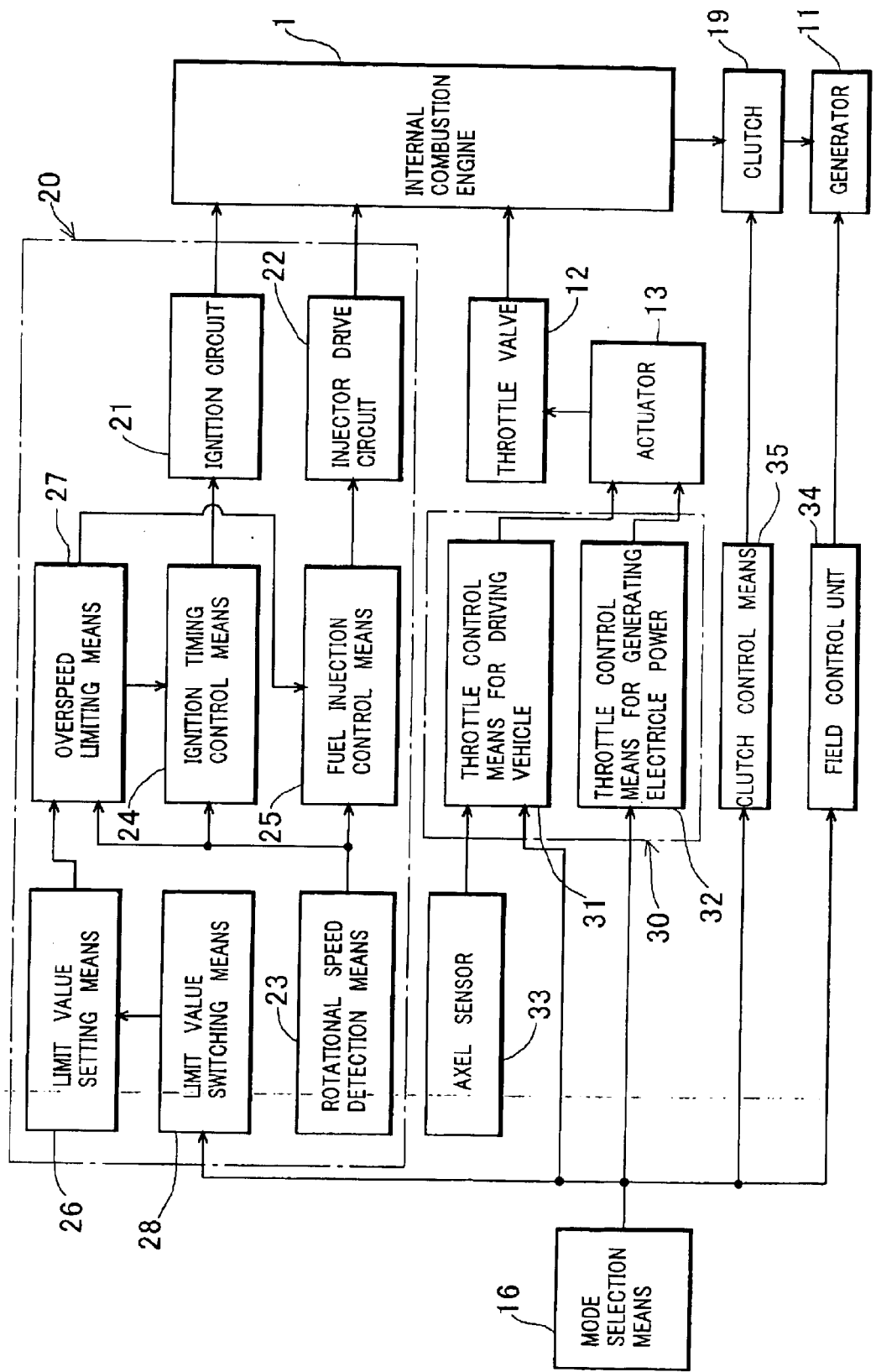
FIG. 4 is a block diagram of a construction of a control device used in the embodiment of FIG. 1.

FIG. 4 shows a construction of the control device used in the embodiment of FIG. 1, and in FIG. 4, a reference numeral 20 denotes the internal combustion engine control unit. The shown internal combustion engine control unit is comprised of an ignition circuit 21, an injector drive circuit 22, rotational speed detection means 23, ignition timing control means 24, fuel injection control means 25, limit value setting means 26, overspeed limiting means 27, and limit value switching means 28.

The ignition circuit 21 is a circuit that generates a high voltage for ignition when the ignition timing control means 24 provides an ignition signal. The high voltage for ignition generated by the ignition circuit is applied to an ignition plug mounted to the cylinder head of the internal combustion engine.

The injector drive circuit 22 is a circuit that supplies a drive current to the injector (the electromagnetic fuel injector valve) mounted to the intake pipe or the like of the internal combustion engine. The injector drive circuit 22 supplies the drive current to the injector while the fuel injection control means 25 provides an injection instruction signal. The injector opens its valve to inject fuel while the injector drive circuit 22 supplies the drive current. A fuel pump supplies the fuel to the injector. A pressure of the fuel supplied to the injector is kept at constant by a pressure regulator, thus the fuel injection amount is determined by a time when the injector injects the fuel (a fuel injection time).

The rotational speed detection means 23 is means for detecting the rotational speed of the engine. The rotational speed detection means 23 uses the output of the signal generator, that is mounted to the engine and generates the pulse at the particular crank angle position, as an input, and arithmetically operates the rotational speed of the engine from a generation interval (a time required for the engine to rotate through a certain angle) of pulses output by the signal generator to detect the rotational speed of the engine.

The ignition timing control means 24 arithmetically operates an ignition timing of the engine in accordance with the various control conditions such as the rotational speed detected by the rotational speed detection means and the throttle valve opening degree detected by the throttle sensor 14, and provides an ignition signal to the ignition circuit 21 when the arithmetically operated ignition timing is detected.

The fuel injection control means 25 arithmetically operates the injection amount of the fuel injected from the injector in accordance with the various control conditions such as the rotational speed of the engine, the throttle valve opening degree, the atmospheric pressure, the engine temperature, or the like, and provides a rectangular waveform injection instruction signal having a signal width corresponding to the arithmetically operated injection amount to the injector drive circuit 22.

The limit value setting means 26 is means for providing a limit value (an upper limit value) of the rotational speed of the internal combustion engine, and stores, in a memory, a limit value for driving vehicle and a limit value for generating electric power that are suited for vehicle driving and generation, respectively. The limit value setting means 26 reads a predetermined limit value from the memory in accordance with a reading instruction provided from the limit value switching means 28, and provides the limit value to the overspeed limiting means 27.

The overspeed limiting means 27 is means for controlling the rotational speed of the internal combustion engine so as not to exceed the limit value. The shown overspeed limiting means 27 is comprised so that when the rotational speed detected by the rotational speed detection means 23 exceeds the limit value provided from the limit value setting means 26, the overspeed limiting means 27 stops the output of the ignition signal from the ignition timing control means 24 to prevent the ignition circuit from outputting the high voltage for ignition, causing misfire of the engine, and at the same time, stops providing the injection instruction signal from the fuel injection control means 25 to the injector drive circuit 22 to stop the fuel injection, reducing the rotational speed of the engine below the limit value.

The overspeed limiting means 27 may have various constructions besides the above described constructions. The overspeed limiting means 27 may be comprised so that, for example, the ignition timing of the internal combustion engine is delayed when the rotational speed of the internal combustion engine exceeds the limit value, thus reducing the rotational speed of the engine below the limit value.

The limit value switching means 28 is particularly provided in the invention, and is means for switching the limit value of the rotational speed of the engine in accordance with the control mode selected by the mode selection means 16. The shown limit value switching means 28 provides the reading instruction to the limit value setting means 26 in accordance with the selected control mode so that when the mode selection means 16 selects the vehicle driving mode, the limit value setting means 26 reads the limit value for driving vehicle from the memory to provide the limit value to the overspeed limiting means 27, and when the mode selection means 16 selects the generating mode, the limit value setting means 26 reads the limit value for generating electric power from the memory to provide the limit value to the overspeed limiting means 27.

The limit value for driving vehicle is appropriately set in view of a maximum speed of the vehicle. The limit value for generating electric power is set to a value below the clutch-in speed of the centrifugal clutch 2.

A construction of the internal combustion engine control unit 20 is similar to conventional one, except that the limit value switching means 28 is provided.

A throttle control unit 30 is comprised of throttle control means for driving vehicle 31 and throttle control means for generating electric power 32.

The throttle control means for driving vehicle 31 controls the actuator 13 so that, when the mode selection means 16 selects the vehicle driving mode, the actuator 13 uses a target throttle opening degree arithmetically operated from an output of an axle sensor 33 that detects displacement of an axel operation unit (an axel grip or an axel pedal) operated by a driver, and uses the output of the throttle sensor 14 that detects the throttle valve opening degree as inputs, and adapts the throttle valve opening degree to an operation amount of an axel operation member by the driver.

The throttle control means for generating electric power 32 is means for controlling the throttle valve opening degree so as to rotate the internal combustion engine 1 at a rotational speed required for generating a nominal output from the generator 11 when the mode selection means 16 selects the generating mode. In this embodiment, a synchronous generator in which the field control is performed is used as the generator 11, thus the throttle control means for generating electric power controls the actuator 13 so as to rotate the internal combustion engine at a rotational speed required for keeping output frequencies of the generator at commercial frequencies when the generating mode is selected, and controls the throttle valve opening degree.

In this embodiment, engine control means is comprised of the throttle control means for generating electric power 32.

The engine control means is means for controlling the internal combustion engine so as to rotate the internal combustion engine at the rotational speed required for generating the nominal output from the generator when the mode selection means selects the generating mode. In the above described embodiment, the engine control means is comprised of the means for controlling the throttle valve opening degree so as to rotate the engine at the rotational speed required for generating the nominal output from the generator when the generating mode is selected, but the construction of the engine control means is not limited to the above described embodiment. For example, if the internal combustion engine has an air bypass passage that bypasses the throttle valve, and an amount of air passing through the air bypass passage (an air bypass amount) is controlled to control the rotational speed of the engine, the engine control means may be comprised of means for controlling the air bypass amount so as to rotate the engine at the rotational speed required for generating the nominal output from the generator when the generating mode is selected.

In the embodiment of FIG. 4, a field control unit 34 and clutch control means 35 are provided. The field control unit 34 is means for controlling the field current of the generator so that a deviation between an output voltage and a nominal value of the generator 11 becomes zero. The means may be comprised of, for example, output voltage detection means for detecting the output voltage of the generator 11; voltage deviation arithmetic operation means for arithmetically operating the deviation between the output voltage detected by the detection means and the nominal value; field current arithmetic operation means for arithmetically operating the field current required for the deviation arithmetically operated by the voltage deviation arithmetic operation means to become zero; and field current adjustment means for adjusting the field current passed through a field coil of the generator to be equal to a value arithmetically operated by the field current arithmetic operation means.

The clutch control means 35 is means for controlling the generator clutch 19 so as to be switched off when the mode selection means 16 selects the vehicle driving mode, and switched on when the mode selection means 16 selects the generating mode. This means is comprised of means for controlling a current energizing an electromagnetic clutch that constitutes the generator clutch 19 in accordance with the control mode selected by the mode selection means 16.

Figure 2:
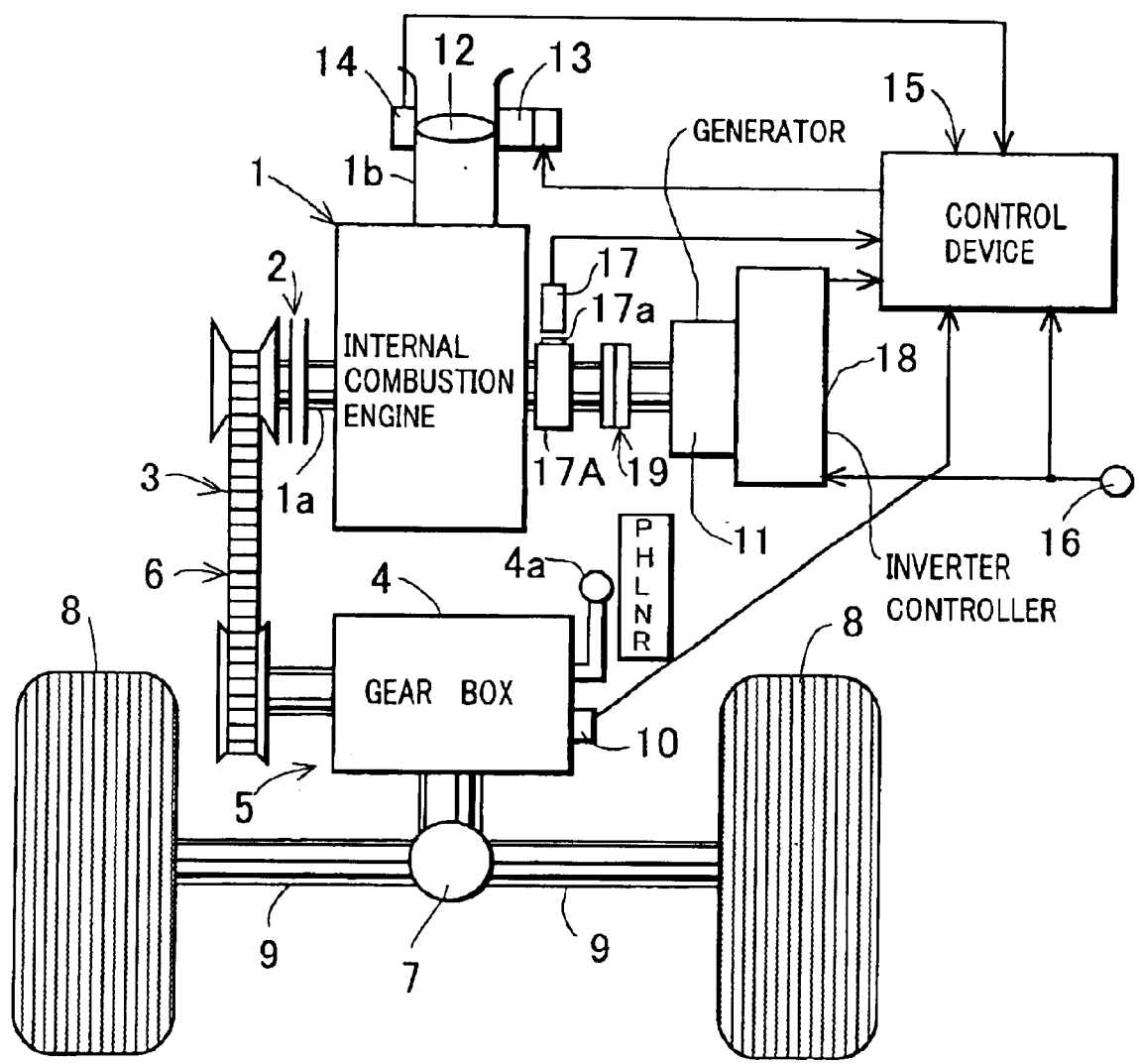
FIG. 2 is a schematic diagram of a construction of another embodiment of the invention.
Figure 5:
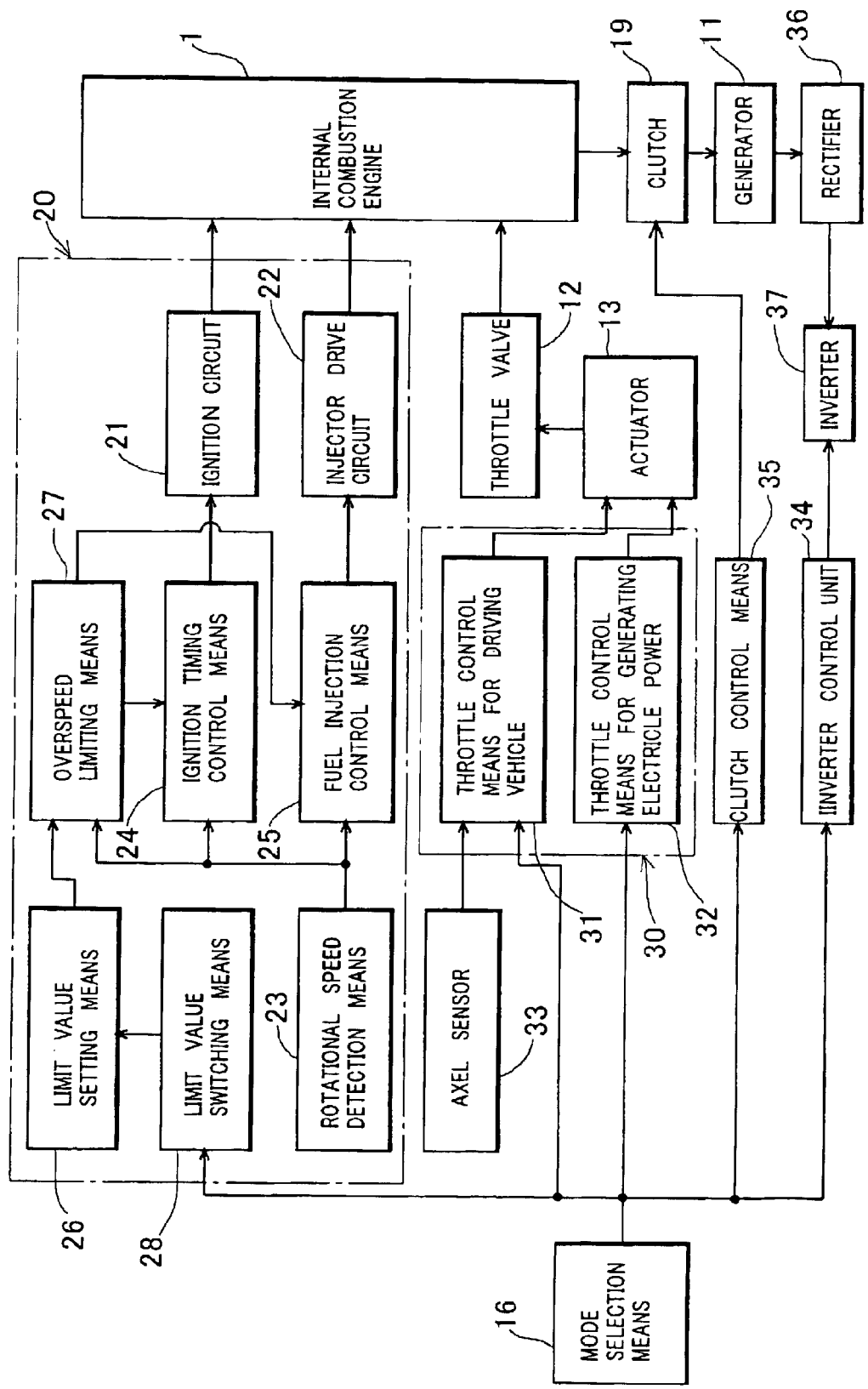
FIG. 5 is a block diagram of a function of a construction of a control device used in the embodiment of FIG. 2.

In the above described embodiment, the synchronous generator that can perform the field control is used as the generator, but as shown in FIG. 2, if a magneto is used as the generator 11 to convert the output of the generator 11 into an AC voltage at commercial frequencies via an rectifier and an inverter, the control device is comprised as shown in FIG. 5.

Specifically, when the magneto is used as the generator, a DC converter that converts the output of the generator into a DC output, and an inverter that converts the DC output of the DC converter into an AC output are provided. The control device 15 further includes inverter control means for controlling the inverter so as to generate the AC output at commercial frequencies from the inverter.

In this case, the engine control means is comprised so as to control the internal combustion engine to rotate the internal combustion engine at the rotational speed required for keeping an output voltage of the inverter at a nominal value when the generating mode is selected.

As the DC converter, a rectifier including a diode bridge full-wave rectifier circuit or the like may be used, or a controllable rectifier including a hybrid bridge circuit of a diode and a switch element such as a thyristor or an FET. When the controllable rectifier is used as the DC converter, the switch element that constitutes the controllable rectifier is controlled on/off to control the output voltage of the DC converter.

The wordings "rotate the internal combustion engine at the rotational speed required for keeping an output voltage of the inverter at a nominal value" mean both of control so as to change the rotational speed of the internal combustion engine with changes of the load in order to keep the output voltage of the inverter at the nominal value, and control so as to keep the rotational speed of the internal combustion engine at a set value when the output of the DC converter or an on-duty cycle of a switch element of the inverter is changed with changes of the load at the state where the rotational speed of the internal combustion engine is kept at the set value.

In the embodiment of FIG. 5, the output of the generator 11 is converted into the AC output at commercial frequencies via a rectifier 36 and a inverter 37 that constitute the DC converter, and supplied to a load (not shown). In this case, the control device has an inverter control unit 34. The inverter control unit 34 controls on/off a switch element that constitutes the inverter 37 to output the AC voltage at commercial frequencies from the inverter 37.

Also in this case, there is provided target rotational speed arithmetic operation means (not shown) for arithmetically operating a rotational speed required for matching an output voltage of the inverter 37 with a target value as a target rotational speed, based on a deviation between the target value (a nominal value) of the output voltage of the inverter 37 and an output voltage of the rectifier 36 (the DC converter), and the target rotational speed arithmetically operated by the target rotational speed arithmetic operation means is provided to the throttle control means for generating electric power 32.

The throttle control means for generating electric power 32 controls the actuator 13 so as to match the rotational speed of the internal combustion engine with the target rotational speed when the generating mode is selected. Thus, the generator 11 is controlled so as to generate the nominal output, and the rotational speed of the internal combustion engine is controlled so as to output the nominal voltage from the inverter 37. Other constructions of the control device in FIG. 5 are similar to those in FIG. 4.

In FIG. 5, instead of the rectifier 36, a controllable rectifier (a rectifier having a function of controlling an output voltage and a current) including, for example a hybrid bridge circuit of a diode and a switch element such as a thyristor or an FET and the like may be used to constitute the DC converter.

In the above description, the inverter control unit 34 controls the inverter 37 so as to output the AC voltage at commercial frequencies from the inverter 37, and the throttle control means for generating electric power 32 controls the throttle valve opening degree so as to rotate the internal combustion engine at the rotational speed required for keeping the output voltage of the inverter at the nominal value. Alternatively, the throttle control means for generating electric power 32 may control to keep the rotational speed of the internal combustion engine at a set speed, and the inverter control unit 34 may control an on-duty ratio of the switch element that constitutes the inverter 37 to keep the output voltage of the inverter 37 at the nominal value against the changes of the load.

If the controllable rectifier is used instead of the rectifier 36, the throttle control means for generating electric power 32 may control the throttle valve opening degree so as to keep the rotational speed of the internal combustion engine at the set speed, and separate control means may control the output voltage of the controllable rectifier so as to keep the output voltage of the inverter 37 at the nominal value against the changes of the load (in this case, the inverter control unit 34 controls the inverter 37 so as to keep output frequencies of the inverter 37 at commercial frequencies).

In the invention, the generator 11 is comprised so as to generate the nominal output while the internal combustion engine 1 rotates at the rotational speed between an idle rotational speed and the clutch-in speed (the rotational speed at which the centrifugal clutch 2 is connected).

In this way, the generator is comprised so as to generate the nominal output while the internal combustion engine rotates at the rotational speed between the idle rotational speed and the clutch-in speed (the rotational speed at which the centrifugal clutch 2 is connected), thus the throttle control means for generating electric power 32 controls to rotate the internal combustion engine at the speed between the idle rotational speed and the clutch-in speed when the generating mode is selected. Therefore, the rotational speed of the engine does not reach the clutch-in speed at the time of generation. This prevents the centrifugal clutch from being connected to cause runaway of the vehicle at the time of generation.

Various kinds of means can be used for generating the nominal output from the generator at the rotational speed between the idle rotational speed and the clutch-in speed of the internal combustion engine. Generally, output to rotational speed characteristics of the generator may be appropriately set by adjusting the field of the generator, and the number of turns of armature winding. Thus, for example, increasing the number of turns of the armature winding of the generator, or strengthening the field compared to the conventional generator allows the generator to generate the nominal output at a lower rotational speed, and allows the generator to be designed so as to generate the nominal output while the internal combustion engine rotates at the rotational speed between the idle rotational speed and the clutch-in speed.

In some cases, increasing the clutch-in speed of the centrifugal clutch may allow the generator to generate the nominal output at the rotational speed between the idle rotational speed and the clutch-in speed. Specifically, in order to generate the nominal output from the generator, if the clutch-in speed of the conventional centrifugal clutch is too low, the clutch-in speed may be changed to be higher than the rotational speed required for generating the nominal output from the generator.

Figure 3:
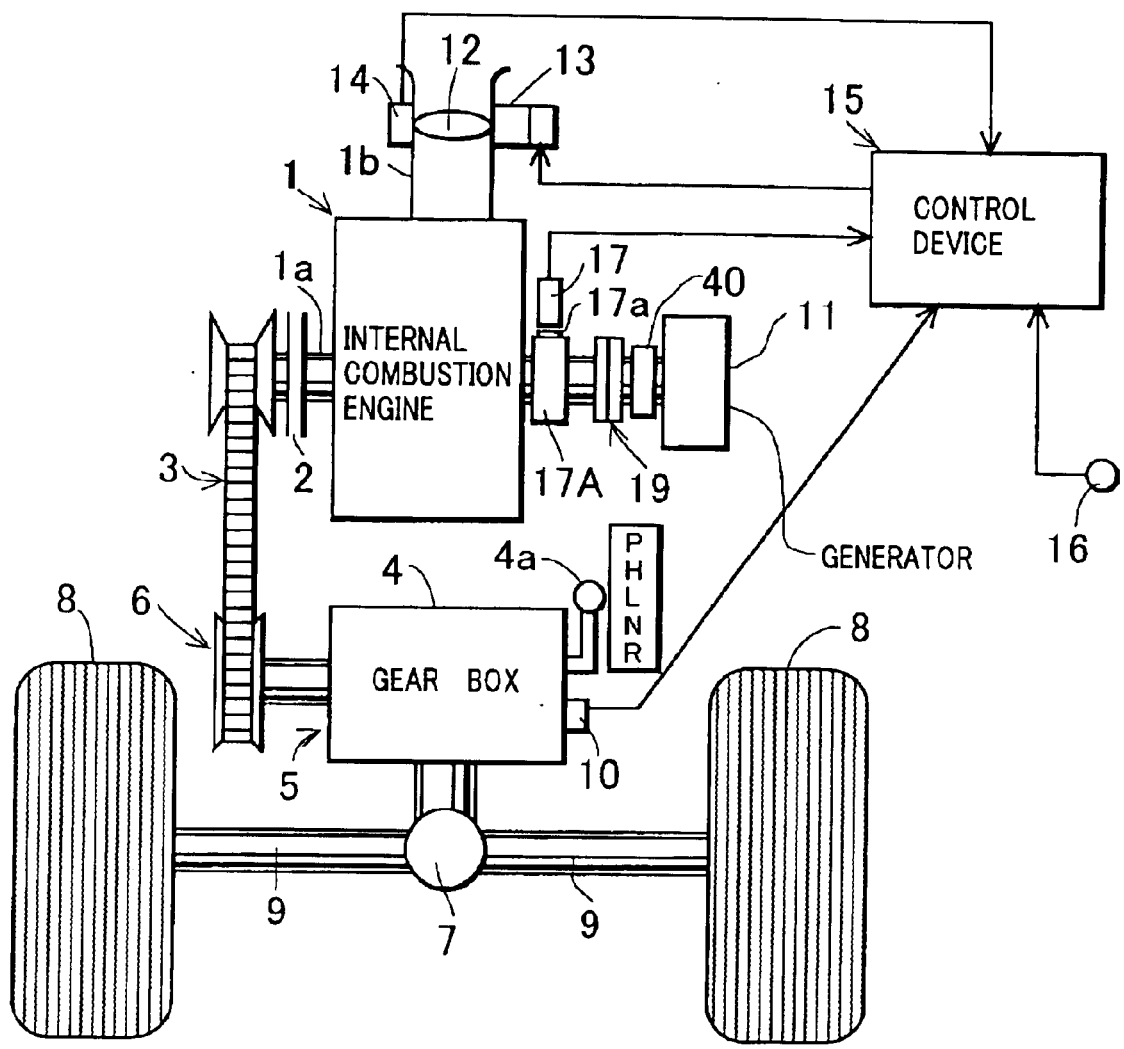
FIG. 3 is a schematic diagram of a construction of a further embodiment of the invention.

If uncomfortable vehicle driving is caused when the clutch-in speed is reset higher, as shown in FIG. 3, an acceleration mechanism 40 including a differential gear or the like is provided between the crankshaft 1a of the internal combustion engine and the rotor of the generator 11 to rotate the rotor of the generator at a speed higher than a rotational speed of the crankshaft. This allows the generator to generate the nominal output at the rotational speed between the idle rotational speed and the clutch-in speed of the engine by using a generator equivalent to the conventional generator that generates the nominal output at the speed higher than the clutch-in speed.

As shown in FIG. 3, the acceleration mechanism 40 is provided to rotate the rotor of the generator 11 at the speed higher than the rotational speed of the crankshaft, allowing the generator to be rotated at the speed higher than the rotational speed between the idle rotational speed and the clutch-in speed of the engine, thus providing a compact high output generator. When the synchronous generator is used as the generator, and the output of the generator is adjusted by controlling the field current, the output frequencies of the synchronous generator can be easily kept at commercial frequencies.

For example, a synchronous generator can be used that generates an AC output of 60 Hz at a rotational speed of 3600 r/min when the clutch-in speed is 2000 r/min.

As the embodiments shown in FIGS. 1, 2 and 3, the generator clutch 19 is provided between the crankshaft of the engine and the rotor of the generator to prevent the generator from generating an excessive output when the vehicle is driven. Particularly, as shown in FIG. 3, the acceleration mechanism 40 is provided between the rotor of the generator and the crankshaft to prevent the rotational speed of the generator from increasing to exceed a mechanical high speed rotation limit when the vehicle is driven.

As the above described embodiments, the control device 15 includes the overspeed limiting means 27 for limiting the rotational speed of the internal combustion engine below the limit value, and the limit value switching means 28 for switching the limit value so that the limit value is suited for vehicle driving when the mode selection means selects the vehicle driving mode, and the limit value is below the clutch-in speed when the mode selection means selects the generating mode. The limit value of the rotational speed of the internal combustion engine is switched below the clutch-in speed when the generating mode is selected, thus preventing the centrifugal clutch from being connected even if the load of the generator 11 is rapidly lightened to cause delay in closing the throttle valve 12 and thus temporary increase in the rotational speed of the engine, thereby increasing safety.

Figure 6:
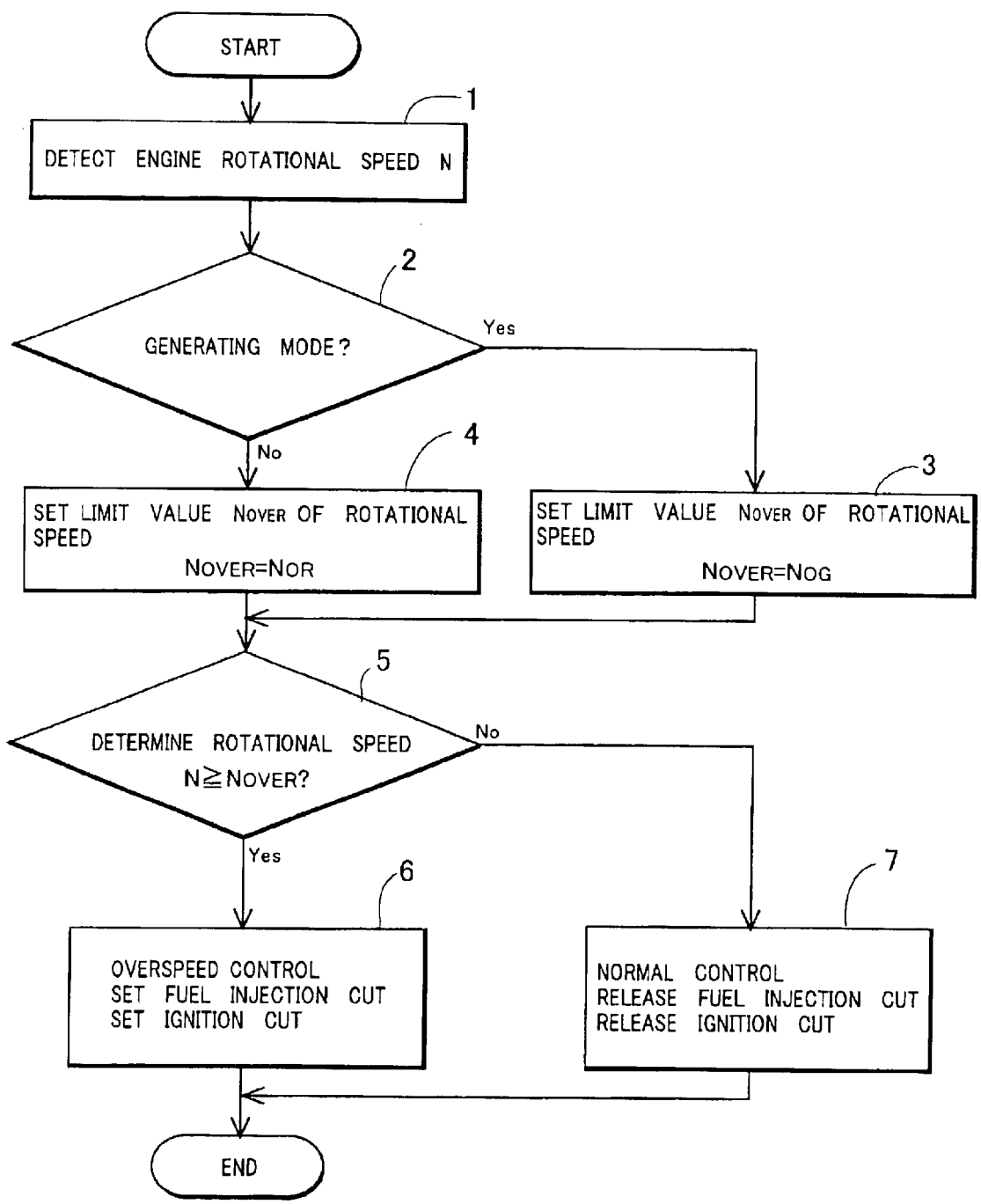
FIG. 6 is a flowchart of essential portions of an algorithm of a program executed by a microprocessor in order to realize overspeed limiting means and limit value switching means in the control device in FIG. 4 or FIG. 5.

FIG. 6 is a flowchart of an algorithm of a program executed by the microprocessor in order to constitute the overspeed limiting means 27 and the limit value switching means 28. According to the algorithm, first in Step 1, a rotational speed N of an engine is detected. The rotational speed can be detected by reading a rotational speed arithmetically operated by the rotational speed detection means 23 provided in the internal combustion engine control unit 20 and stored in the memory. Then, in Step 2, a control mode selected by the mode selection means 16 is determined. When it is determined in this determination process that the control mode is the generating mode, the process goes to Step 3, and a limit value for generating electric power $N_{OG}$ set lower than the clutch-in speed is set as a limit value $N_{OVER}$ of the rotational speed in overspeed protection control. In Step 2, when it is determined that the selected control mode is not the generating mode (the vehicle driving mode), the process goes to Step 4, and a limit value for driving vehicle $N_{OR}$ is set as the limit value $N_{OVER}$ of the rotational speed in the overspeed protection control.

Next, in Step 5, the rotational speed N of the engine detected in Step 1 is compared with the limit value $N_{OVER}$. When it is determined from the comparison to be $N \geq N_{OVER}$, the process goes to Step 6, and the overspeed protection control is performed. In this overspeed protection control, providing an injection instruction signal to the injector drive circuit 22 is stopped to stop fuel injection, and providing an ignition signal to the ignition circuit 21 is stopped to stop an ignition operation to cause misfire of the engine, thereby reducing the rotational speed of the internal combustion engine below the limit value. When it is determined in Step 5 to be $N<N_{OVER}$, the process goes to Step 7, and the stop of the fuel injection and the stop of the ignition operation are released to perform normal control.

As described above, the generator clutch 19 that can be switched on/off is provided between the rotor of the generator 11 and the crankshaft of the internal combustion engine, and the clutch control means 35 for controlling the generator clutch so as to be switched off when the mode selection means selects the vehicle driving mode, and switched on when the mode selection means selects the generating mode is provided, thus preventing the generator from generating the excessive output when the vehicle is driven. Particularly, the acceleration mechanism is provided between the rotor of the generator 11 and the crankshaft to prevent the rotational speed of the generator from increasing to exceed the mechanical high speed rotation limit when the vehicle is driven.

As described above, the invention is comprised so that the generator generates the nominal output while the internal combustion engine rotates at a certain rotational speed between the idle rotational speed and the clutch-in speed, thus preventing runaway of the vehicle at the time of generation independently of the gear position of the transmission. In order to further increase safety, the engine control means (the throttle control means for generating electric power 32 in the embodiments of FIGS. 4 and 5) may be comprised so as to control the rotational speed of the internal combustion engine to generate the nominal output from the generator only when the gear position sensor 10 detects a neutral position or a parking position.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A vehicle driven by an internal combustion engine comprising:

a power transmission device being provided between a crankshaft of said internal combustion engine and drive wheels of said vehicle and having a centrifugal clutch to be connected at a speed equal to or higher than a predetermined clutch-in speed;

a generator driven by said internal combustion engine;

mode selection means for selecting a control mode of said internal combustion engine between a vehicle driving mode and a generating mode;

a control device having engine control means for controlling said internal combustion engine so as to rotate said internal combustion engine at a rotational speed required for generating a nominal output from said generator when said mode selection means selects the generating mode, wherein the rotational speed required for generating the nominal output from said generator is set between an idle rotational speed and said clutch-in speed of said internal combustion engine and wherein said control device comprises overspeed limiting means for limiting the rotational speed of said internal combustion engine below a limit value, and limit value switching means for switching said limit value so that said limit value is suited for driving vehicle when said mode selection means selects the vehicle driving mode, and said limit value is below said clutch-in speed when said mode selection means selects the generating mode.

2. A vehicle driven by an internal combustion engine comprising:
- a power transmission device being provided between a crankshaft of said internal combustion engine and drive wheels of said vehicle and having a centrifugal clutch to be connected at a speed equal to or higher than a predetermined clutch-in speed;
- a generator driven by said internal combustion engine;
- mode selection means for selecting a control mode of said internal combustion engine between a vehicle driving mode and a generating mode; and
- a control device having engine control means for controlling said internal combustion engine so as to rotate said internal combustion engine at a rotational speed required for generating a nominal output from said generator when said mode selection means selects the generating mode, wherein a rotor of said generator is connected to the crankshaft of said internal combustion engine via an acceleration mechanism so that said generator rotates at a speed higher than the rotational speed of said internal combustion engine, the rotational speed required for generating the nominal output from said generator is set between an idle rotational speed and said clutch-in-speed of said internal combustion engine and wherein said control device comprises overspeed limiting means for limiting the rotational speed of said internal combustion engine below a limit value, and limit value switching means for switching said limit value so that said limit value is suited for driving vehicle when said mode selection means selects the vehicle driving mode, and said limit value is below said clutch-in speed when said mode selection means selects the generating mode.

* * * * *